Patented June 5, 1934

1,961,980

UNITED STATES PATENT OFFICE 1,961,980

PRODUCTION OF 1.3-BUTYLENE GLYCOL

Martin Mueller-Cunradi, Ludwigshafen-on-the-Rhine, and Wolfgang Haag, Mannheim, Germany, assignors to I. G. Farbenindustrie Aktiengesellschaft, Frankfort - on - the - Main, Germany, a corporation of Germany No Drawing. Application September 4, 1929, Serial No. 390,436. In Germany October 9, 1928

7 Claims. (Cl. 260—156.5)

The present invention relates to the production of 1.3-butylene glycol.

It is already known that 1.3-butylene glycol may be obtained from acetaldol by hydrogenation in the presence of a catalytic substance the catalytic constituent of which consists of nickel.

We have now found that butylene glycol can also be obtained in particularly high yields by the hydrogenation of aldol with the aid of a catalytic substance containing essentially copper, with which other substances, such as other catalytic substances and/or activators or carriers, may be incorporated, if desired. When catalytic substances containing both copper and nickel are employed the amount of copper should exceed that of nickel. The employment of copper as catalytic substance has the advantage, in contrast to the employment of nickel, that the catalyst is less susceptible to poisoning by impurities and is more easily prepared.

Salts of copper, for example copper silicate, if desired in admixture with other suitable substances, such as cobalt or nickel compounds or those of the noble metals, may be employed for the preparation of the catalytic substances. Moreover the copper salts may be applied onto suitable carriers, for example silica gel, vitreous aluminium oxide, water glass and the like. The process in accordance with the present invention is preferably carried out at superatmospheric pressure say at between about 50 and 200 atmospheres but also lower or higher pressures may be applied. The temperatures employed are usually between 10° and 75° C. but higher temperatures may be applied as well.

The following examples will further illustrate the nature of this invention but the invention is not restricted to these examples.

Example 1

50 per cent aqueous acetaldol together with hydrogen at a pressure of 200 atmospheres and at a temperature of 90° centigrade are led, into a pressure tight vessel filled with a copper catalyst which has been prepared by soaking silicic acid with copper nitrate and subsequently decomposing the nitrate by heating and reducing at a temperature of 200° centigrade. 1.3-butylene glycol is formed without any appreciable side reactions.

Example 2

Hydrogen is introduced, while shaking, at a pressure of from 50 to 100 atmospheres and at a temperature of from 40° to 65° centigrade into an aqueous solution of acetaldol in which solution a copper catalyst is suspended which has been prepared by precipitation on vitreous aluminium oxide in the manner described in Example 1. The acetaldol is hydrogenated smoothly into 1.3-butylene glycol.

Example 3

Aqueous acetaldol is treated in a shaking autoclave with hydrogen at a pressure of from 50 to 100 atmospheres and at a temperature of from 40° to 65° centigrade in the presence of a copper silicate catalyst which has been prepared by precipitating copper nitrate solution with the calculated quantity of water glass, washing, drying and reducing at a temperature of 250° centigrade. 1.3-butylene glycol is obtained in very good yields.

Example 4

50 per cent aqueous aldol is shaken together with a catalyst consisting of 80 per cent by weight of silica gel, 16 per cent of copper and 4 per cent of nickel which has been prepared by reduction, in an autoclave at 50° C. while feeding it with hydrogen and keeping the pressure at about 150 atmospheres. The aldol is easily and completely converted into 1.3-butylene glycol, which result is also obtained when the nickel has been replaced by cobalt.

Example 5

50 per cent aqueous aldol is shaken together with a catalyst consisting of 78 per cent by weight of silica gel, 2 per cent of alumina and 20 per cent of copper which has been prepared by reduction at 200° C., in an autoclave at from 50° to 60° C. after feeding the vessel with hydrogen and while keeping the pressure at about 100 atmospheres. The aldol is easily and completely converted into 1.3-butylene glycol.

What we claim is:—

1. The process for the production of 1.3-butylene glycol which comprises contacting liquid acetaldol in the presence of impure hydrogen with a catalytic substance the metallic constituent of which is copper.

2. The process for the production of 1.3-butylene glycol which comprises contacting liquid acetaldol in the presence of impure hydrogen with a catalytic substance the metallic constituent of which is copper, and which contains a carrier.

3. The process for the production of 1.3-butylene glycol which comprises contacting liquid acetaldol in the presence of impure hydrogen at superatmospheric pressure with a catalytic substance the metallic constituent of which is copper.

4. The process for the production of 1.3-butylene glycol which comprises contacting liquid acetaldol in the presence of impure hydrogen at superatmospheric pressure and at a temperature between about 10° and 130° C. with a catalytic substance the metallic constituent of which is copper.

5. The process for the production of 1.3-butylene glycol which comprises contacting liquid acetaldol in the presence of impure hydrogen with a catalytic substance consisting of copper deposited on a carrier.

6. The process for the production of 1.3-butylene glycol which comprises contacting liquid acetaldol in the presence of impure hydrogen at superatmospheric pressure with a catalytic substance consisting of copper deposited on a carrier.

7. The process for the production of 1.3-butylene glycol which comprises contacting liquid acetaldol in the presence of impure hydrogen at superatmospheric pressure and at a temperature between about 10° and 130° C. with a catalytic substance consisting of copper deposited on a carrier.

MARTIN MUELLER-CUNRADI.
WOLFGANG HAAG.